(12) United States Patent
Wang et al.

(10) Patent No.: US 7,001,097 B2
(45) Date of Patent: Feb. 21, 2006

(54) TUBULAR JOINT ASSEMBLY

(75) Inventors: Pei-Chung Wang, Troy, MI (US);
Peter C. Sun, Rochester Hills, MI (US); Kenneth R. Schmidt, Macomb, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/405,957

(22) Filed: Apr. 2, 2003

(65) Prior Publication Data

US 2004/0197134 A1    Oct. 7, 2004

(51) Int. Cl.
*F16B 7/08* (2006.01)

(52) U.S. Cl. .................. 403/231; 403/245; 403/246; 403/262; 403/337; 403/382; 296/29; 296/193.06

(58) Field of Classification Search ............. 403/205, 403/230, 231, 237, 242, 245, 246, 262, 382, 403/383, 403, 292, 295, 335, 337; 296/203.03, 296/205, 209, 193.06, 29
See application file for complete search history.

(56) References Cited

U.S. PATENT DOCUMENTS

| | | | |
|---|---|---|---|
| 5,332,281 A * | 7/1994 | Janotik et al. ............. 296/209 |
| 5,794,398 A * | 8/1998 | Kaehler et al. ............ 52/653.2 |
| 5,829,219 A * | 11/1998 | Sugawara et al. ......... 52/653.2 |
| 6,241,310 B1 * | 6/2001 | Patelczyk ................... 296/205 |
| 6,408,515 B1 * | 6/2002 | Durand ...................... 29/897.2 |
| 6,811,195 B1 * | 11/2004 | Klocke et al. ............... 296/29 |

FOREIGN PATENT DOCUMENTS

JP          4-11581      * 1/1992

* cited by examiner

*Primary Examiner*—Daniel P. Stodola
*Assistant Examiner*—Michael P. Ferguson
(74) *Attorney, Agent, or Firm*—Kathryn A. Marra

(57) ABSTRACT

A joint assembly for joining first and second tubular members. The first member has flanges extending from walls of an end segment. The walls of the end segment define a receiving opening. The second member has walls and a protrusion having sides extending from the walls to an end of the protrusion. When the members are joined the protrusion is received in the opening of the end segment so that the sides of the protrusion are in facing engagement with the walls of the end segment and the flanges engage the walls of the second member. The members are secured together at some of the engaging surfaces. The protrusion reduces stress on the flanges and increases the mechanical strength of the assembly.

4 Claims, 4 Drawing Sheets

TUBULAR JOINT ASSEMBLY

TECHNICAL FIELD

This invention generally relates to motor vehicle frames and more particularly to motor vehicle frames constructed of individual tubular members and to joints for connecting tubular members.

BACKGROUND OF THE INVENTION

Hydroforming is known in the art and is used to form tubular members for motor vehicle frames and many other components. Tubular hydroformed frame members are formed using high-pressure fluid to outwardly expand a tubular blank into conformity with surfaces of a die to form an irregularly shaped tubular member. The frame members are then joined to form a frame.

Methods of joining hydroformed frame members may involve welding or riveting the members together at overlapping points of engagement, which may include flanges extending from the end of one member and contacting the surface of another member. The flanges are often the weakest part of the assembly.

An improved joint having increased strength is desired.

SUMMARY OF THE INVENTION

The present invention provides an improved joint for a vehicle frame the joint formed between first and second elongated tubular members. The first member has flanges extending from walls of an end segment. The walls of the end segment define a receiving opening inside the end segment.

The second member has walls and at least one protrusion with sides extending from the walls of the second member to an end portion of the protrusion. The sides of the protrusion are angled outward toward the walls.

During assembly, some of the flanges are bent to engage the walls of the second member. As the walls of the end segment engage the sides of the protrusion, the contact guides and positions the second member on the first member. When the protrusion is fully inserted into the receiving opening of the end segment, the walls of the end segment are in facing engagement with the sides of the protrusion, and the flanges engage the walls of the second member. The contacting portions between the first and second members are joined together to form an improved joint. In an exemplary embodiment, a row of welds joins the flanges and the walls of the second member, and a second row of welds joins the walls of the end segment and the sides of the protrusion. Alternatively, the members may be joined by welding, riveting, adhesive bonding, weld bonding, or rivet bonding.

The sides of the protrusion provide an abutment against the walls of the end segment and provide an additional surface for securing together the first and second members. Securing the end segment to the protrusion reduces the stress put on the flanges. As a result, the mechanical strength of the joint is increased.

These and other features and advantages of the invention will be more fully understood from the following description of certain specific embodiments of the invention taken together with the accompanying drawings. As used in the specification and claims and shown in the drawings, the term tubular, as applied to a member of a joint assembly, refers to a hollow elongated member (tube) having enclosing walls, and at least one end opening with a closed periphery at the open end or end segment.

DESCRIPTION OF THE PREFERRED EMBODIMENT

Figure 1:
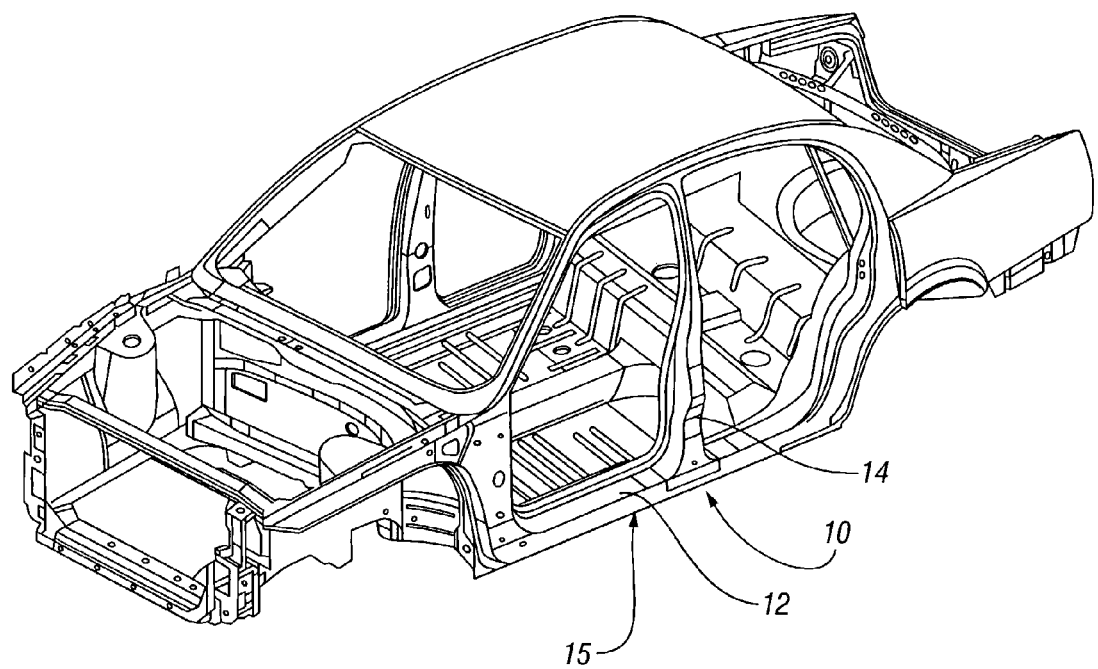
FIG. 1 is an exploded pictorial view of an exemplary tubular joint assembly according to the present invention as applied in a portion of an automotive frame.

Referring now to FIG. 1 of the drawings in detail, numeral 10 generally indicates a tubular frame assembly for a vehicle. The frame 10 includes an elongated tubular rocker 12 joined with an elongated tubular pillar 14. The rocker 12 extends longitudinally along the bottom of a doorframe 15. The pillar 14 extends upward from the rocker 12 to form a side member for doorframe 15.

Figure 2:
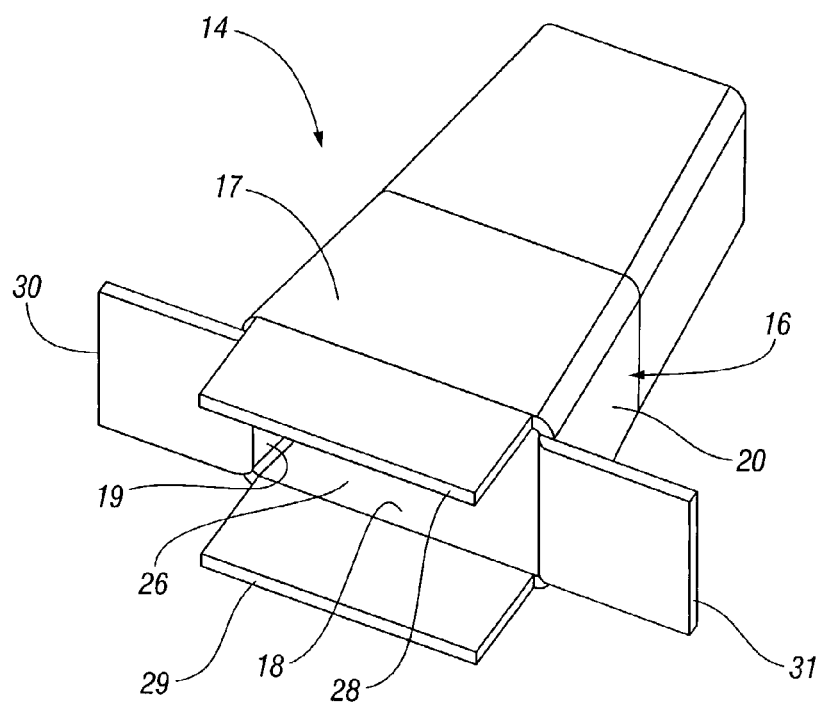
FIG. 2 is a pictorial end view of a tubular pillar according to the present invention.

Referring now to FIG. 2, the pillar 14 has an end segment 16 with walls 17–20. The walls 17–20 of the end segment define a receiving opening 26 extending into the pillar 14. Flanges 28–31 extend from the walls 17–20 of the end segment 16. Flanges 28, 29 extend outward from opposite walls 17, 18 of the end segment 16. Flanges 30, 31 extend laterally outward from opposite walls 19, 20 of the end segment 16.

Figure 3:
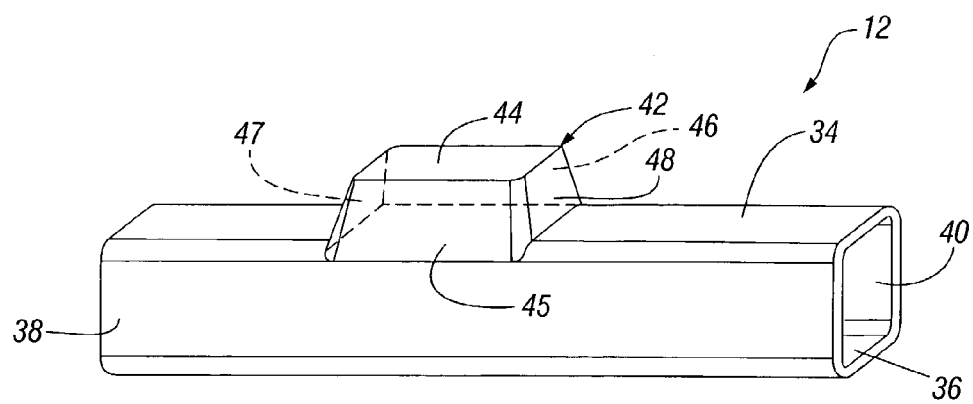
FIG. 3 is a pictorial view of a hydroformed rocker according to the present invention.

Referring now to FIG. 3, the rocker 12 has upper 34, lower 36, and side walls 38, 40. A hydroformed protrusion 42 is formed in the upper wall 34 of the rocker 12. The protrusion 42 has an end 44 and sides 45–48 extending from upper wall 34, to the end 44 of the rocker 12. The sides 45–48 of the protrusion 42 are formed having a shape similar to the walls 17–20 of the end segment 16, so that the sides 45–48 of the protrusion 42 are in facing engagement with the walls 17–20 of the end segment 16 when the rocker and pillar 12, 14 are joined. The sides 45–48 of the protrusion may be slightly angled outward toward the upper wall 34 of the rocker 12.

Engagement of the sides 45–48 of the protrusion 42 and the walls 17–20 of the end segment 16 provides additional points of contact for joining the rocker and pillar 12, 14. In addition, the sides 45–48 of the protrusion 42 create abutments inside the walls 17–20 of the end segment 16, which further secure the rocker 12 to the pillar 14. These features provide additional mechanical strength for the assembly 10.

Figure 4:
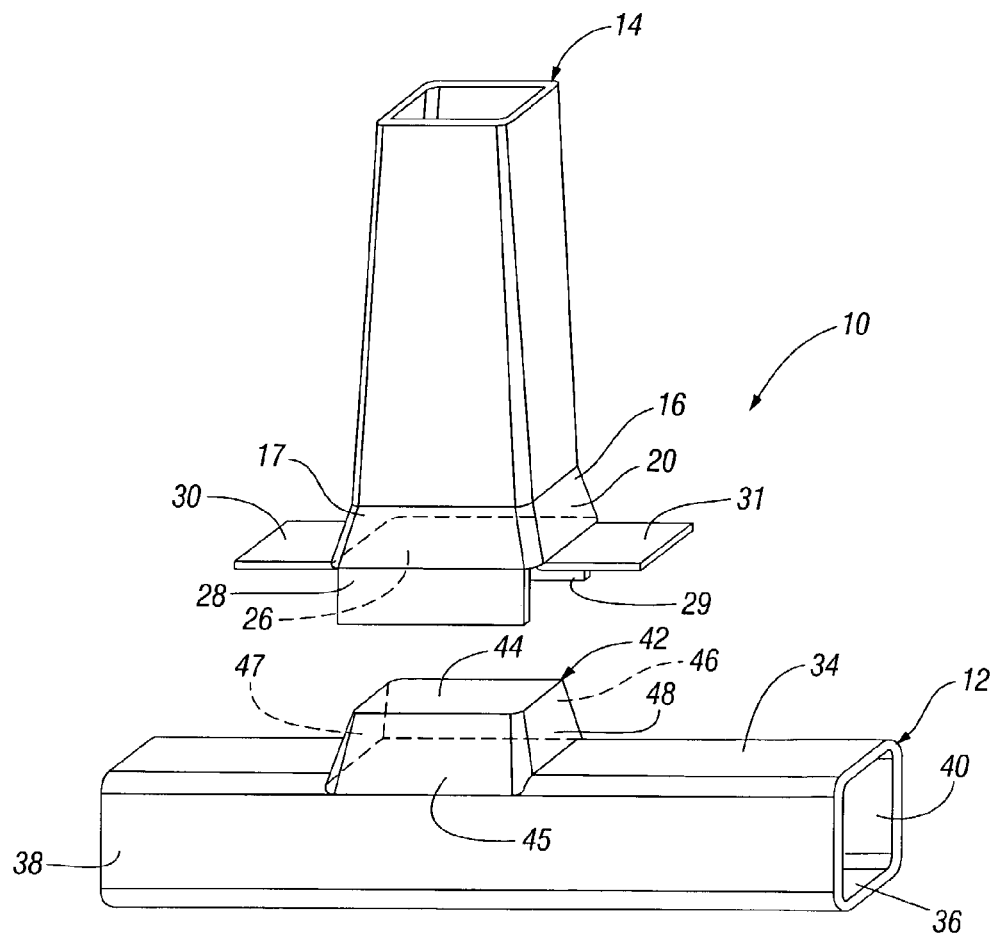
FIG. 4 is an exploded pictorial view of the pillar of FIG. 2 and the rocker of FIG. 3.

FIG. 4 shows the protrusion 42 being inserted into the receiving opening 26 of the end segment 16. The angled shape of the protrusion 42 provides an entry portion of smaller size than the opening 26 of the end segment 16 to provide additional room for insertion. As the protrusion 42 is inserted into the end segment 16, the walls 17–20 of the end segment 16 engage the sides 45–48 of the protrusion 42 to guide the pillar 14 onto the rocker 12. Since the protrusion 42 provides a consistent mounting point, the rocker and pillar 12, 14 can be consistently joined at the same location. Thus, the protrusion 42 allows for consistently reproduced frame assemblies 10 with minimal tolerance from frame to frame.

Figure 5:
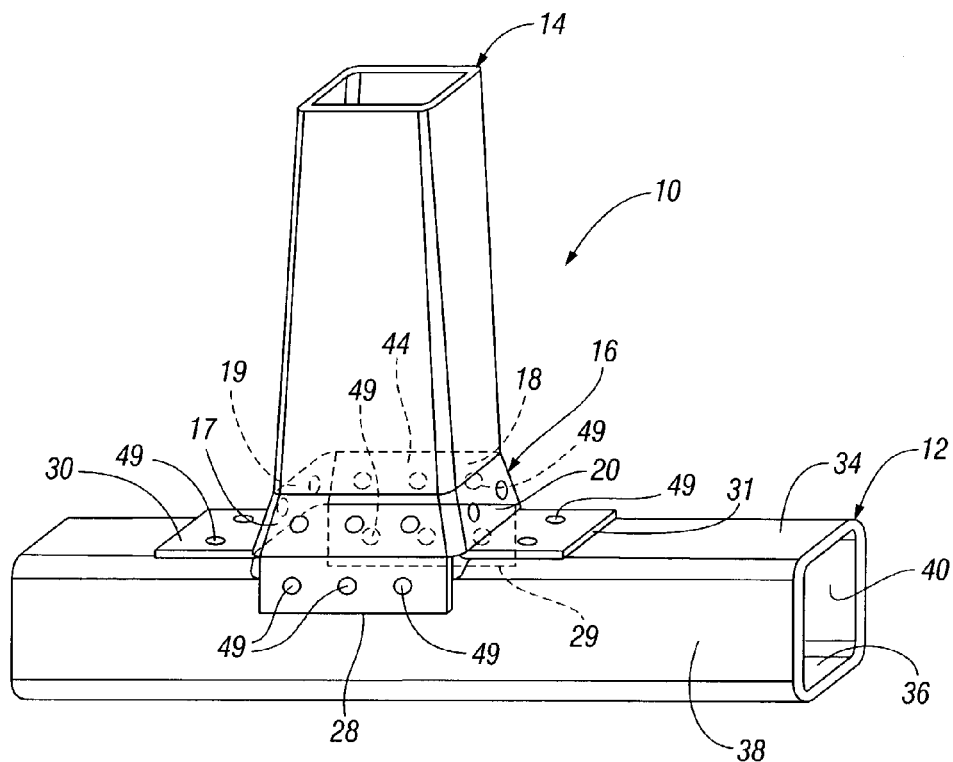
FIG. 5 is a view similar to FIG. 4 showing the final assembly of the pillar and rocker.

FIG. 5 shows the joined rocker and pillar 12, 14. The flanges 28, 29 extend downward from the walls 17–18 of the end segment 16 and engage the sidewalls 38, 40 of the rocker 12. The laterally extending flanges 30, 31 engage the upper wall 34 of the rocker 12.

FIG. 5 shows the rocker and pillar 12, 14 being joined by a series of welds 49. Preferably, a first plurality of welds 49 join the flanges 28–31 to the walls 38, 40, and 34 of the rocker 12 and a second plurality of welds 49 join the walls 17–20 of the end segment 16 to the sides 45–48 of the protrusion 42. Weld spacing and frequency may vary depending upon strength requirements and stress loads on the assembly 10, thus it may not be necessary to weld at every point of engagement.

Alternatively, the rocker and pillar 12, 14 may be joined by riveting, adhesive bonding, weld bonding, rivet bonding, or seam welding.

The welds 49 attaching the flanges 28–31 to the walls 38, 40, and 34 of the rocker 12 provide a primary attachment between the rocker 12 and the pillar 14. As a load is placed on the assembly 10, the flanges 28–31 become stressed.

The protrusion 42 makes the assembly 10 stronger by reducing the amount of stress on the flanges 28–31. The stress is reduced by providing additional engagement points for joining the rocker 12 to the pillar 14. These additional connections share the load placed on the assembly 10 and thereby reduce stress on the flanges 28–31. In addition, the sides 45–48 of the protrusion 42 form abutments against the walls 17–20 of the end segment 16, which further reduces stress on the flanges 28–31. As a result, the mechanical strength of the assembly 10 increases as the amount of stress placed on the flanges 28–31 decreases.

Figure 6:
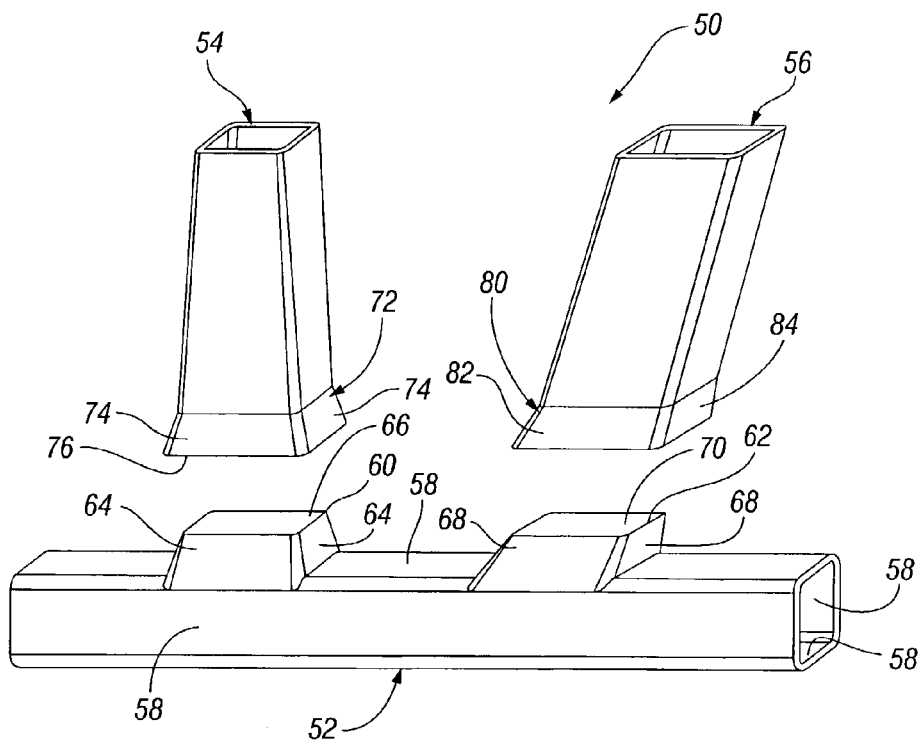
FIG. 6 is a pictorial view of an alternative embodiment of a hydroformed joint assembly.

FIG. 6 shows an alternative embodiment of tubular frame assembly 50. Assembly 50 includes including first, second, and third elongated members 52, 54, and 56. The first member 52 has walls 58, and first and second protrusions 60, 62. Protrusion 60 has sides 64 extending from the walls 58 of the first member 52 to an end 66. Protrusion 62 also has sides 68 extending from the walls 58 of the first member 52 to an end 70 of the protrusion 62. The sides 64, 68 of the protrusions 60, 62 may be angled for receiving members at an angle.

The second elongated tubular member 54 has an end segment 72 having walls 74 defining a receiving opening 76. The receiving opening 76 of the end segment 72 has slightly larger dimensions than the first protrusion 60, so that the opening 76 can be received by the first protrusion 60.

The second elongated tubular member 56 has an end segment 80 having walls 82 defining a receiving opening 84. The opening 84 of the end segment 80 has slightly larger dimension than the second protrusion 62, so that the opening 84 can be received by the second protrusion 62.

FIG. 6 shows the members 52, 54, 56 aligned for assembly. The first member 52 extends longitudinally. The second member 54 is aligned perpendicular to the first member 52 so that the receiving opening 76 is aligned with the first protrusion 60. The third member 56 is aligned at an angle to the first member 52 so that the receiving opening 84 is aligned with the second protrusion 62.

Figure 7:
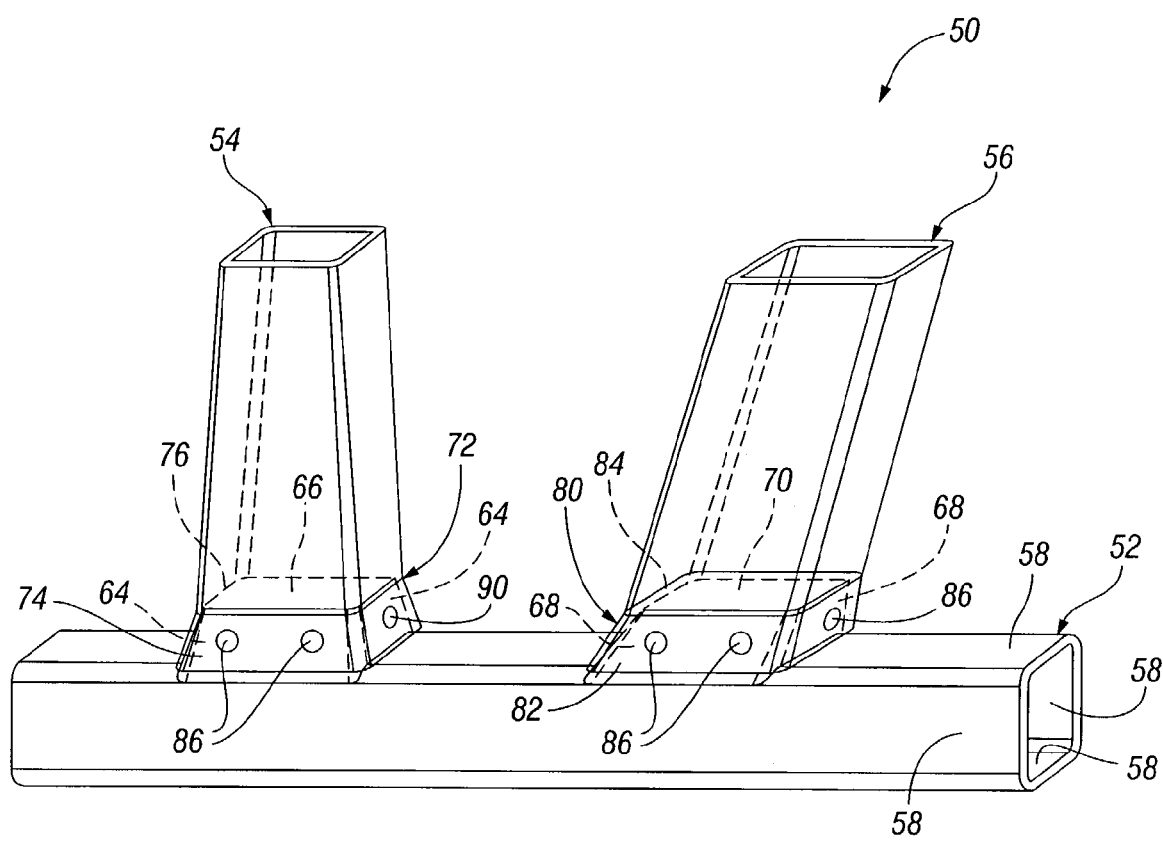
FIG. 7 is a pictorial view of the tubular assembly of FIG. 6.

FIG. 7 shows the members 52, 54, 56 assembled. A plurality of rivets 86, join the walls 74 of the end segment 72 to the sides 64 of the first protrusion 60. Similarly, the walls 82 of the end segment 80 are joined with rivets 86 to the sides 68 of the second protrusion 62. Other joining techniques may be used in place of riveting to join members 52, 54, 56, such as spot welding, adhesive bonding, weld bonding, rivet bonding, or seam welding.

The joints formed between the protrusions 60, 62 and the end segments 72, 80 are supported by their interlocking shapes. This reduces stress put on the rivets 86 while the assembly 50 is under load. As a result, the mechanical strength of the assembly 50 is increased.

The mechanical strength of the assembly 50 may be further increased by adding flanges, similar to the flanges of assembly 10, to the end segments 72, 80 of the second and third members 54, 56 and welding or riveting them to the first member 52.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A joint assembly joining a one-piece portion of a hydroformed hollow tubular vehicle body pillar to a one-piece portion of a hydroformed hollow tubular vehicle body rocker;

the tubular vehicle body pillar portion having flanges extending from enclosing walls of an end segment, a receiving opening having a closed periphery defined by the walls of the end segment; and the tubular vehicle body rocker portion having enclosing walls and a closed end protrusion, the protrusion having sides extending from a wall of the rocker portion to the end of the protrusion;

the protrusion being received in the receiving opening of the end segment with the sides of the protrusion in facing engagement with the walls of the receiving opening;

the flanges engaging the walls of the rocker portion; and the pillar portion and the rocker portion being secured together by a plurality of connections between the flanges and the walls of the rocker portion and a plurality of connections between the walls of the end segment and the sides of the protrusion.

2. A joint assembly as in claim 1 wherein the connections are rivets.

3. A joint assembly as in claim 1 wherein the connections are welds.

4. A joint assembly as in claim 1 wherein the sides of the protrusion are angled outward toward walls of the rocker portion to guide the end segment of the pillar portion during assembly.

* * * * *